(12) United States Patent
Voelker et al.

(10) Patent No.: US 10,591,000 B2
(45) Date of Patent: Mar. 17, 2020

(54) ONE-WAY CLUTCH ASSEMBLY AND COUPLING MEMBER FOR THEREIN WHEREIN LOCKING MEMBER DYNAMICS WITH RESPECT TO STRUT LAYDOWN SPEED ARE ENHANCED

(71) Applicant: Means Industries, Inc., Saginaw, MI (US)

(72) Inventors: Brandon J. Voelker, Saginaw, MI (US); Todd M. Andrzejewski, Montrose, MI (US); George J. Coppens, Bay City, MI (US)

(73) Assignee: Means Industries, Inc., Saginaw, MI (US)

( * ) Notice: Subject to any disclaimer, the term of this patent is extended or adjusted under 35 U.S.C. 154(b) by 11 days.

(21) Appl. No.: 15/589,474

(22) Filed: May 8, 2017

(65) Prior Publication Data

US 2017/0343060 A1    Nov. 30, 2017

Related U.S. Application Data

(60) Provisional application No. 62/340,723, filed on May 24, 2016.

(51) Int. Cl.
*F16D 41/12*    (2006.01)

(52) U.S. Cl.
CPC ................. *F16D 41/125* (2013.01)

(58) Field of Classification Search
CPC ...... F16D 41/12; F16D 41/125; F16D 41/185; F16D 7/048; F16D 43/14; F16D 2043/145; F16D 41/14; F16D 41/16; F16D 41/30

USPC .................................................. 192/46, 84.6
See application file for complete search history.

(56) References Cited

U.S. PATENT DOCUMENTS

| | | | |
|---|---|---|---|
| 4,050,560 A | 9/1977 | Torstenfelt | |
| 5,070,978 A | 12/1991 | Pires | |
| 5,362,293 A | 11/1994 | Romanauskas | |
| 5,449,057 A | 9/1995 | Frank | |
| 5,597,057 A | 1/1997 | Ruth et al. | |
| 5,638,929 A | 6/1997 | Park | |
| 5,678,668 A | 10/1997 | Sink | |
| 5,918,715 A | 7/1999 | Ruth et al. | |
| 5,927,455 A * | 7/1999 | Baker ..................... | F16D 41/16 192/36 |
| 5,964,331 A | 10/1999 | Reed et al. | |

(Continued)

OTHER PUBLICATIONS

International Search Report and Written Opinion, PCT/US2017/033216, dated Aug. 3, 2017, 8 pages.

(Continued)

*Primary Examiner* — Jacob S. Scott
*Assistant Examiner* — James J Taylor, II
(74) *Attorney, Agent, or Firm* — Brooks Kushman P.C.

(57) ABSTRACT

A coupling member for an engageable coupling assembly includes a coupling face having at least one pocket. Each pocket is sized and shaped to receive and nominally retain a locking member that lays down in its pocket during an overrunning condition of the assembly at a laydown angular velocity of the coupling member about a rotational axis of the assembly. Each pocket has a pocket axis which is angled with respect to a normal to a centerline of the coupling member to improve locking member dynamics with regards to strut laydown speed during the overrunning condition.

10 Claims, 9 Drawing Sheets

(56) References Cited

U.S. PATENT DOCUMENTS

| | | | |
|---|---|---|---|
| 6,116,394 A * | 9/2000 | Ruth | F16D 41/125 192/46 |
| 6,186,299 B1 * | 2/2001 | Ruth | F16D 41/12 192/113.32 |
| 6,193,038 B1 | 2/2001 | Scott et al. | |
| 6,244,965 B1 | 6/2001 | Klecker et al. | |
| 6,290,044 B1 | 9/2001 | Burgman et al. | |
| 6,503,167 B1 | 1/2003 | Sturm | |
| 6,571,926 B2 | 6/2003 | Pawley | |
| 6,577,033 B1 * | 6/2003 | Sekine | F16H 41/28 192/46 |
| 6,814,201 B2 | 11/2004 | Thomas | |
| 6,896,111 B2 * | 5/2005 | Fitz | F16D 41/125 192/46 |
| 6,953,409 B2 | 10/2005 | Schmidt et al. | |
| 7,093,512 B2 | 8/2006 | Ibamoto et al. | |
| 7,100,756 B2 | 9/2006 | Kimes et al. | |
| 7,198,587 B2 | 4/2007 | Samie et al. | |
| 7,223,198 B2 | 5/2007 | Kimes et al. | |
| 7,256,510 B2 | 8/2007 | Holmes et al. | |
| 7,258,214 B2 | 8/2007 | Pawley et al. | |
| 7,275,628 B2 | 10/2007 | Pawley et al. | |
| 7,344,010 B2 | 3/2008 | Felling, Jr. et al. | |
| 7,349,010 B2 | 3/2008 | Bryant et al. | |
| 7,464,801 B2 | 12/2008 | Wittkopp | |
| 7,484,605 B2 | 2/2009 | Pawley et al. | |
| 7,491,151 B2 | 2/2009 | Maguire et al. | |
| 7,743,678 B2 | 6/2010 | Wittkopp et al. | |
| 7,824,292 B2 | 11/2010 | Samie et al. | |
| 7,942,781 B2 | 5/2011 | Kimes | |
| 7,967,121 B2 * | 6/2011 | Cali | F16D 41/125 192/42 |
| 7,992,695 B2 | 8/2011 | Wittkopp et al. | |
| 8,011,464 B2 | 9/2011 | Samie et al. | |
| 8,042,669 B2 | 10/2011 | Samie et al. | |
| 8,042,670 B2 | 10/2011 | Bartos et al. | |
| 8,051,959 B2 | 11/2011 | Eisengruber | |
| 8,056,690 B2 | 11/2011 | Samie et al. | |
| 8,061,496 B2 | 11/2011 | Samie et al. | |
| 8,079,453 B2 | 12/2011 | Kimes | |
| 8,083,042 B2 | 12/2011 | Samie et al. | |
| 8,087,502 B2 | 1/2012 | Samie et al. | |
| 8,365,892 B2 * | 2/2013 | Sturgin | F16D 41/185 192/46 |
| 8,522,940 B2 * | 9/2013 | Prout | F16D 41/125 192/113.32 |
| 8,857,590 B2 * | 10/2014 | Shaw | F16D 41/12 192/46 |
| 2006/0185957 A1 | 8/2006 | Kimes et al. | |
| 2006/0278486 A1 * | 12/2006 | Pawley | F16D 41/12 192/43.1 |
| 2007/0289832 A1 * | 12/2007 | Fitz | F16D 41/125 192/46 |
| 2008/0110715 A1 | 5/2008 | Pawley | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0098970 A1 | 4/2009 | Kimes | |
| 2009/0194381 A1 | 8/2009 | Samie | |
| 2010/0063693 A1 | 3/2010 | Lee et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0183806 A1 | 7/2011 | Wittkopp et al. | |
| 2011/0214962 A1 | 9/2011 | Shaw et al. | |
| 2011/0233026 A1 | 9/2011 | Pawley | |
| 2011/0297500 A1 | 12/2011 | Shaw et al. | |
| 2015/0047944 A1 * | 2/2015 | Kimes | F16D 3/12 192/71 |

OTHER PUBLICATIONS

International Preliminary Report on Patentability, PCT/US2017/033216, dated Nov. 27, 2018, 5 pages.

* cited by examiner

ONE-WAY CLUTCH ASSEMBLY AND COUPLING MEMBER FOR THEREIN WHEREIN LOCKING MEMBER DYNAMICS WITH RESPECT TO STRUT LAYDOWN SPEED ARE ENHANCED

CROSS-REFERENCE TO RELATED APPLICATIONS

This application claims the benefit of U.S. provisional application Ser. No. 62/340,723 filed May 24, 2016, the disclosure of which is hereby incorporated in its entirety by reference herein.

TECHNICAL FIELD

This invention generally relates to one-way clutch assemblies including selectable one-way clutch assemblies and coupling members for use therein.

OVERVIEW

As described in U.S. Pat. No. 6,571,926 entitled "One-Way Clutch Assembly Featuring Improved Strut Stability" and assigned to the assignee of the present application, clutches are used in a wide variety of applications to selectively couple power from a first rotatable "driving" member, such as a driving disk or plate, to a second, independently-rotatable "driven" member, such as a driven plate or disk. In one known variety of clutches, commonly referred to as "one-way" or "overrunning" clutches, the clutch "engages" to mechanically couple the driving member to the driven member only when the driving member seeks to rotate in a first direction relative to the driven member. Once so engaged, the clutch will release or decouple the driven member from the driving member only when the driving member rotates in a second, opposite direction relative to the driven member. Further, the clutch otherwise permits the driving member to freely rotate in the second direction relative to the driven member. Such "freewheeling" of the driving member in the second direction relative to the driven member is also known as the "overrunning" condition.

One such known one-way clutch employs juxtaposed, nominally-coaxial driving and driven members featuring generally planar clutch faces in closely-spaced axial opposition. Such "planar" one-way clutches, as taught by Frank in U.S. Pat. No. 5,449,057 and Ruth et al. in U.S. Pat. No. 5,597,057, typically include a plurality of recesses formed in the face of the driving member and at least as many recesses formed in the face of the driven member. A thin, flat strut is carried within each of the driving member's pockets such that a first longitudinal end of each strut may readily engage and bear against a shoulder defined by its respective recess of the driving member. The strut's second, opposite longitudinal end is urged toward and against the face of the driven member, for example, by a spring positioned beneath the strut in the recess of the driving member.

When the driving member rotates in the first direction relative to the driven member, the second end of at least one strut engages and thereafter bears against a shoulder defined by a recess of the driven member, whereupon the strut is placed in compression and the driven member is coupled for rotation with the driving member. When the driving member rotates in the second direction relative to the driven member, ramped surfaces defined by other portions of the driven member's recesses urge the second end of each strut back towards the driving member, whereupon the driving member is permitted to freely rotate in the second direction relative to the driven member.

This periodic engagement of the second end of each strut with the ramped surfaces of the driven member's clutch face during clutch overrun may generate a noise or "ratcheting" sound that is often associated with one-way clutches. Known approaches to reduce this ratcheting sound during clutch overrun include modifications to the design of the strut, including reductions in the strut's inertial mass; modifying the spring forces exerted on the strut; and the use of various motion-damping fluid in the space between the clutch faces to thereby better control the dynamics of the strut during clutch overrun. However, further improvement in noise reduction during overrun is desirable, particularly as other clutch components, such as the driven member, become fabricated from materials exhibiting different noise-transmissive characteristics, for example, powdered metal.

"Strut instability" is an unfavorable state often characterized by a strut that is extended when it should be seated in its pocket. Strut instability is a primary concern in terms of durability as it directly correlates to premature spring, strut and pocket wear and eventual failure. It is advantageous during the overrun phase that the struts descend into their respective pockets to minimize parasitic loses due to various Newtonian interactions. The minimum angular velocity of the pocket plate which keeps the strut confined to the pocket is often referred to as the strut "laydown" speed.

The mechanics effecting the descent of the strut are numerous and can be correlated to (among many other factors) rotational velocity of the pocket plate, angular acceleration of the pocket plate, strut geometry, spring coefficient, fluid interactions and pocket wall draft angle.

As previously mentioned (and as shown in FIG. 10), the draft angle of the outer pocket wall can also significantly affect the strut laydown speed. Angles above zero degrees tend to increase the laydown speed, while negative angles can be used to decrease the laydown speed. However, this presents the trade-off of manufacturing complexity, higher draft angles generally represent lower manufacturing costs as they can increase the life of the press used to produce the pocket plate. Whereas zero or negative draft angles are more difficult to produce, and usually require a secondary machining operation.

U.S. published application No. 2011/0297500 (also assigned to the assignee of the present application) provides a dynamic engagement analysis of a strut within its respective pocket wherein various forces acting upon the strut are illustrated and described as follows:

$F_R$=Resultant Strut Force. The force available to push the strut out of its pocket (i.e. resultant force on the strut).

$F_S$=Spring Force. The force created by a spring used to push the strut out of its pocket for engagement with the notch plate.

$F_C$=Centrifugal Force. The effective weight of the strut due to rotation of the pocket plate during operation. (Force of strut against pocket plate wall). This is a fictitious force dependent on the frame of reference of the observer.

$F_F$=Friction Force. This force is created by the effective weight of the strut (centrifugal force) acting on the pocket plate. The higher the rotational speed the larger the friction force. This force prevents the strut from pushing out of its pocket.

$F_P$=Strut Pushout Force. The angle of the pocket plate wall causes the strut to push out of the pocket plate. This is due to the centrifugal forces created by the rotation of the pocket plate.

$F_L$=Fluid Force. This force is created by the effect of the strut displacing transmission fluid when engaging into the notch plate.

As described in the above-noted application a "truly vertical" or "slightly negative" vertical wall improves the stability of a strut or rocker (i.e. collectively referred to as "locking members") which experiences rotational centrifugal forces during overrun. Also the "slightly negative" angle lower the rpm even further at which a strut "locks down" due to such centrifugal forces.

In other words, performance is improved when a pocket plate wall is machined vertical or slightly negative versus a cast, positively angled, surface which may have a draft such as 1-2 degrees or 0.5-1 degrees (i.e. the surface is angled "slightly positive").

U.S. Pat. No. 5,927,455 discloses a bi-directional overrunning pawl-type clutch. U.S. Pat. No. 6,244,965 discloses a planar overrunning coupling for transfer of torque. U.S. Pat. No. 6,290,044 discloses a selectable one-way clutch assembly for use in an automatic transmission. U.S. Pat. Nos. 7,258,214 and 7,484,605 disclose an overrunning coupling assembly. U.S. Pat. No. 7,344,010 discloses an overrunning coupling assembly. U.S. Pat. No. 7,484,605 discloses an overrunning radial coupling assembly or clutch.

Other related U.S. patent publications include: 2011/0183806; 2011/0233026; 2011/0214962; 2010/0252384; 2010/0230226; 2010/0063693; 2010/0200358; 2009/0098970; 2009/0194381; 2008/0223681; 2008/0110715; 2008/0169166; 2008/0185253; 2006/0185957; and the following U.S. Pat. Nos. 7,942,781; 8,079,453; 7,992,695; 8,051,959; 8,011,464; 8,042,669; 8,061,496; 8,042,670; 8,056,690; 8,083,042; 8,087,502; 7,824,292; 7,743,678; 7,491,151; 7,464,801; 7,349,010; 7,275,628; 7,256,510; 7,223,198; 7,198,587; 7,100,756; 7,093,512; 6,953,409; 6,814,201; 6,503,167; 6,193,038; 6,116,394; 6,186,299; 6,571,926; 4,050,560; 5,638,929; 5,362,293; 5,678,668; 5,918,715; 5,070,978 and 5,964,331.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A "moment of force" (often just moment) is the tendency of a force to twist or rotate an object. A moment is valued mathematically as the product of the force and a moment arm. The moment arm is the perpendicular distance from the point or axis of rotation to the line of action of the force. The moment may be thought of as a measure of the tendency of the force to cause rotation about an imaginary axis through a point.

In other words, a "moment of force" is the turning effect of a force about a given point or axis measured by the product of the force and the perpendicular distance of the point from the line of action of the force. Generally, clockwise moments are called "positive" and counterclockwise moments are called "negative" moments. If an object is balanced then the sum of the clockwise moments about a pivot is equal to the sum of the counterclockwise moments about the same pivot or axis.

SUMMARY OF EXAMPLE EMBODIMENTS

An object of at least one embodiment of the present invention is to provide an improved coupling member and one-way clutch assembly wherein locking member or strut dynamics are improved with regards to strut laydown speed by angling the pocket(s) which receive and nominally retain the strut(s). The improvement in strut dynamics is achieved when the strut rotates with reference to the normal axis. This would normally be achieved by rotating the entire pocket, but could also be accomplished just by rotating the outer wall (and inner pocket ear).

In carrying out the above object and other objects of at least one embodiment of the present invention, a coupling member for an engageable coupling assembly is provided. The coupling member has a centerline through a center of the coupling member. The coupling member includes a coupling face having at least one pocket. Each pocket is sized and shaped to receive and nominally retain a locking member that lays down in its pocket during an overrunning condition of the assembly at a laydown angular velocity of the coupling member about a rotational axis of the assembly. Each pocket has a pocket axis which is angled with respect to a normal to the centerline to improve locking member dynamics with regards to strut laydown speed during the overrunning condition.

The pocket axis of each pocket may be rotated outwardly or counter clockwise with respect to the normal. Alternatively, each pocket may be rotated inwardly or clockwise with respect to the normal.

The coupling member may be a pocket plate.

The locking member may be a locking strut.

The coupling face may have an annular coupling face.

The coupling face may have a plurality of pockets. Each of the pockets may be sized and shaped to receive and nominally retain a corresponding locking member.

Each pocket may have a "T" shape.

Each pocket may have an inner recess for receiving a biasing spring wherein each pocket is a spring pocket.

The annular coupling face may be oriented to face axially along the rotational axis.

Each pocket axis may be angled with respect to the normal in a range of −5° to 10°.

Further, in carrying out the above object and other objects of at least one embodiment of the present invention a one-way clutch assembly having a central axis is provided. The assembly includes an annular pocket plate having a centerline through the central axis. The pocket plate includes an annular coupling face having a plurality of pockets spaced from each other about the central axis. Each of the pockets is sized and shaped to receive and nominally retain a locking member that lays down in its pocket during an overrunning condition of the assembly at a laydown angular velocity of the pocket plate about the axis. Each pocket has a pocket axis which is angled with respect to a normal to the centerline to improve locking member dynamics with regards to strut laydown speed during the overrunning condition. An annular notch plate extends around the central axis and includes notches spaced from each other about the central axis. A plurality of locking members are received within the pockets.

The primary axis of each pocket may be rotated outwardly or counter clockwise with respect to the normal. Alternatively, each pocket may be rotated inwardly or clockwise with respect to the normal.

Each of the locking members may be a locking strut.

Each pocket may have a "T" shape.

Each pocket may have an inner recess for receiving a biasing spring wherein each pocket is a spring pocket.

The annular coupling face may be oriented to face axially along the central axis.

Each pocket axis may be angled with respect to the normal in a range of −5° to 10°.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

BRIEF DESCRIPTION OF THE DRAWING FIGURES

DETAILED DESCRIPTION/EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 9:
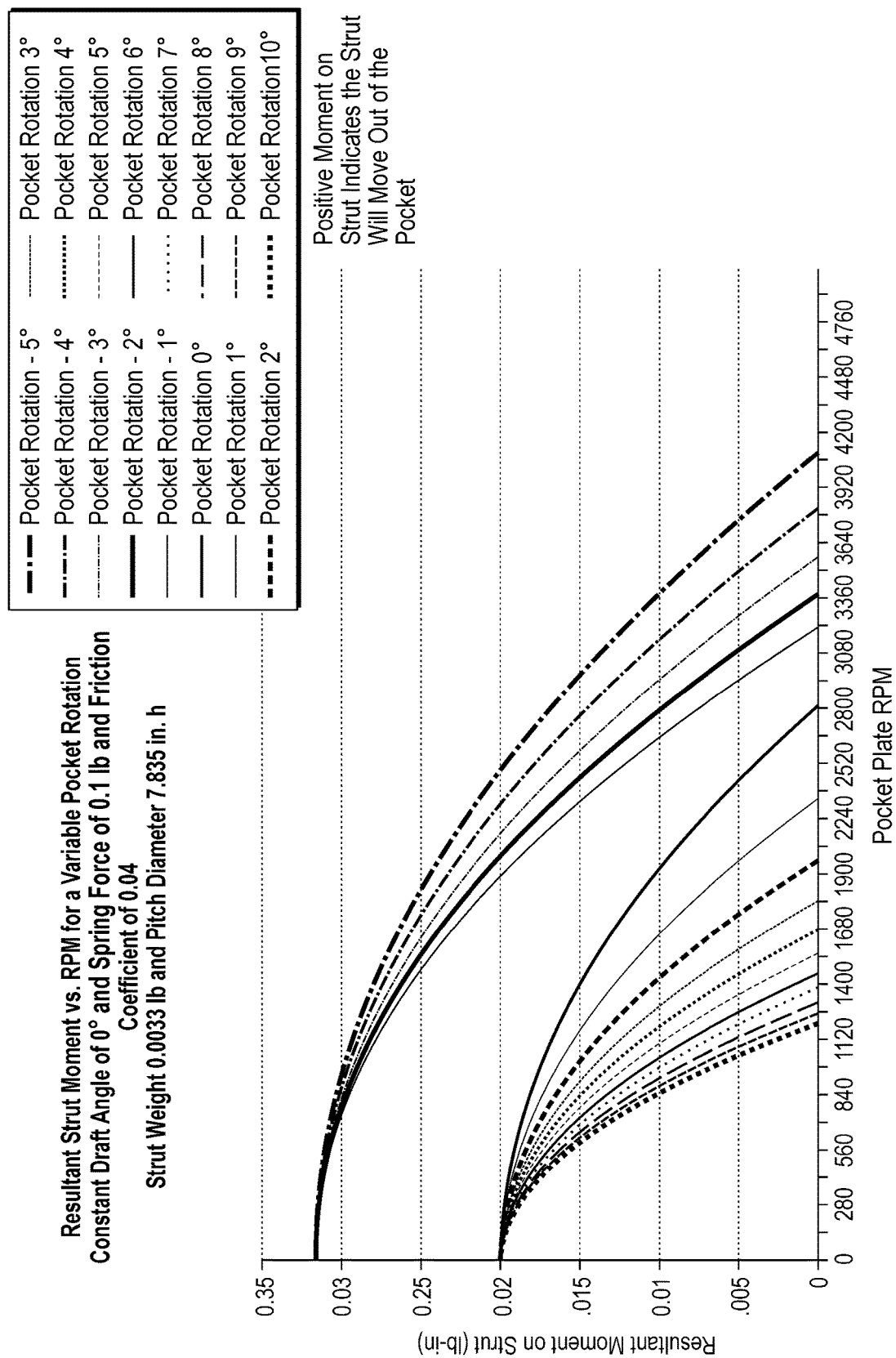
FIG. 9 shows graphs of resultant moment on a strut versus pocket plate RPM for various pocket rotations at a constant draft angle.

Besides the many previously described factors effecting the "laydown" or "lockdown" speed of a strut, the inventors of this application have discovered that "pocket rotation angle" (i.e. angle of the entire pocket (or the outer wall and inner pocket ear of the pocket) within the pocket plate) is another factor that affects laydown speed as shown in FIG. 9. Counter-clockwise (i.e. outward) pocket rotation lowers laydown speed for a rotating pocket plate thereby allowing or compensating for relatively large draft angles which allows lower manufacturing costs. Clockwise (i.e. inward), pocket rotation raises laydown speed as also shown in FIG. 9. The desired speed (i.e. RPM) at which struts laydown determines the clutches ability to engage. Therefore, if it is desired that the clutch engage at a relatively high speed (i.e. RPM), than inward pocket rotation would be used.

With the addition of a pocket rotation, the geometric composition of the strut and its pocket change, resulting in the generation of a new moment due to the centripetal force now acting on the strut. Centripetal force is the physical force causing the strut/lock wall dynamics as described herein. This new moment arises from the relative change of point of rotation about which the strut rises or descends.

Figure 1:
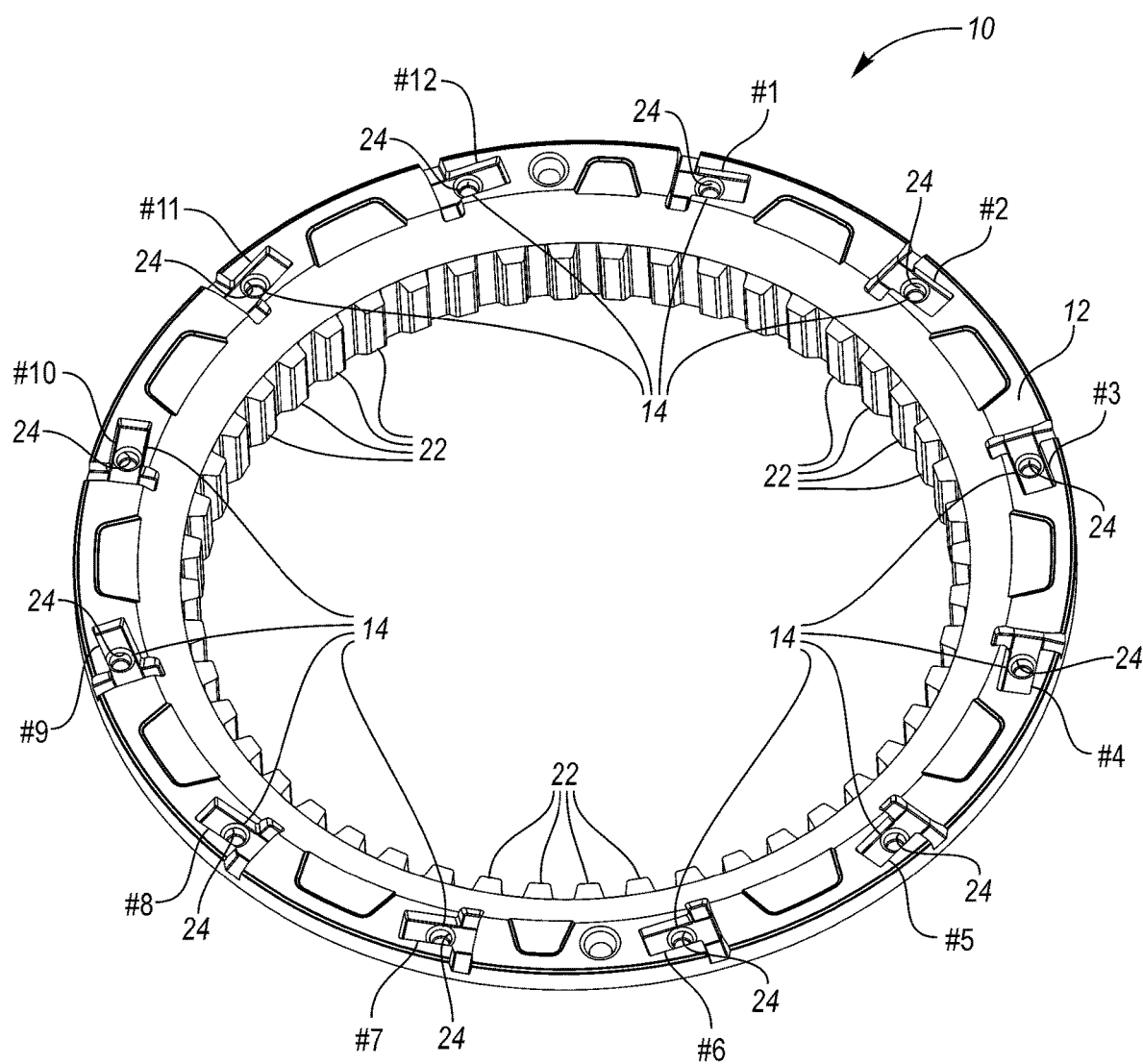
FIG. 1 is a schematic perspective view of a coupling member in the form of a pocket plate constructed in accordance with at least one embodiment of the present invention.
Figure 2:
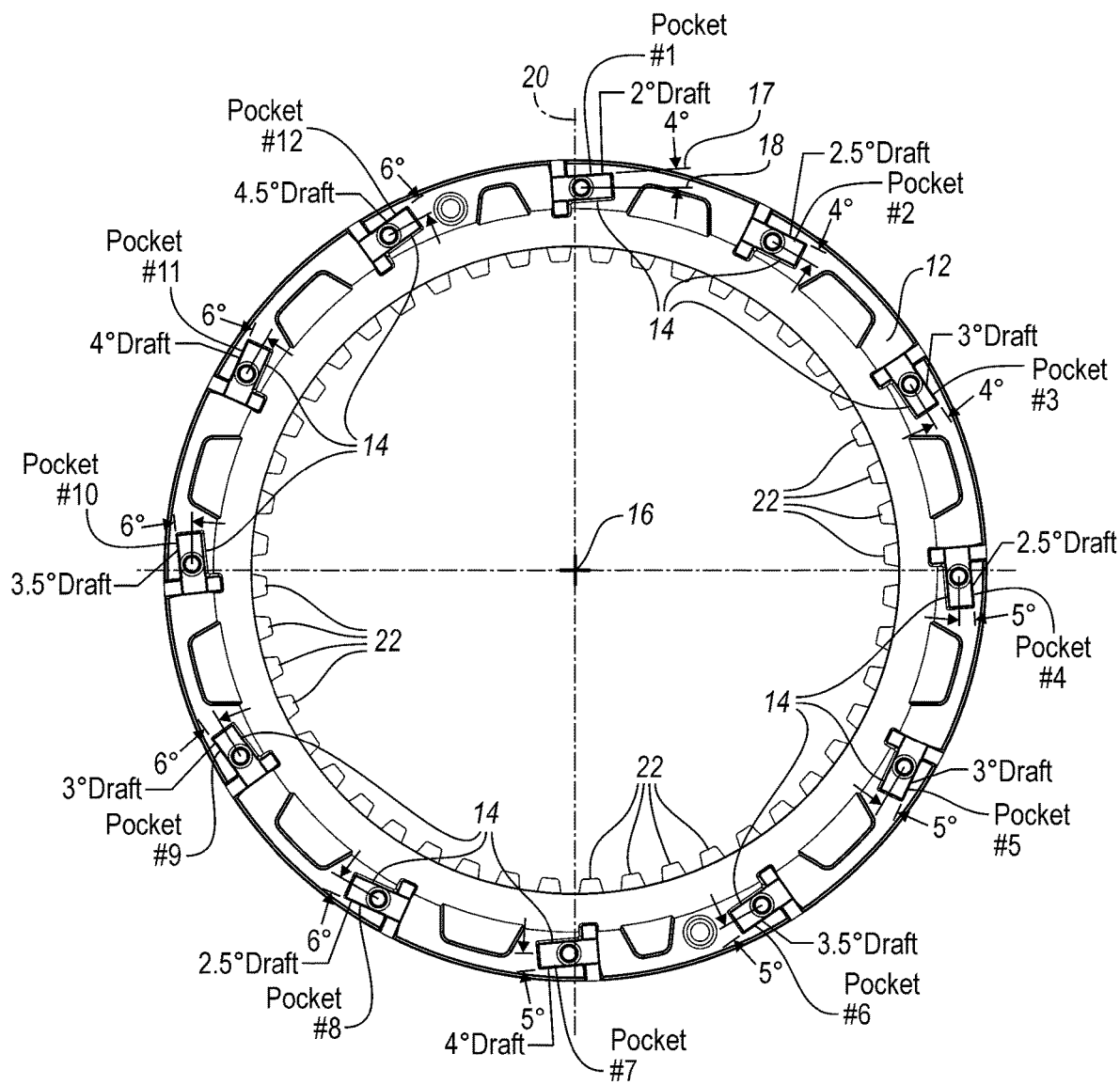
FIG. 2 is a top plan view of the pocket plate of FIG. 1 and showing different possible draft angles and pocket rotation axes for 12 different pockets of the pocket plate.
Figure 8:
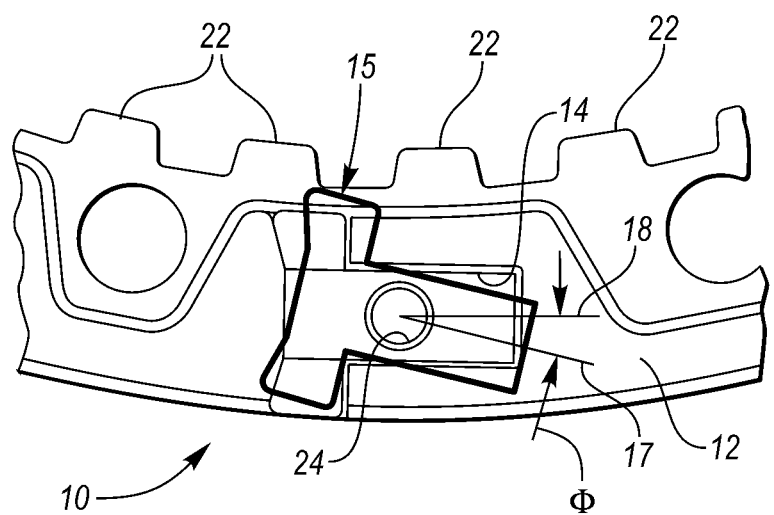
FIG. 8 is a view, partially broken away, of a portion of a pocket plate and having a rotated strut (which is typically received and retained within a rotated pocket such as one of the rotated pockets of FIGS. 1 and 2)

Referring now to FIGS. 1 and 2, there is illustrated a coupling member, generally indicated at 10, for an engageable coupling assembly. The coupling member or pocket plate 10 has a centerline 20 through a center 16 of the coupling member 10. The coupling member 10 includes a coupling face 12 having at least one pocket and, preferably, a plurality of pockets 14 labeled pocket 1-12 in FIGS. 1 and 2. Each of the pockets 14 has a different draft angle and pocket axis angle, $\Phi$, for illustrative purposes. However, it is to be understood that preferably the pockets 14 have the same draft angle and the same pocket axis angle. Each pocket 14 is sized and shaped to receive and nominally retain a locking member such as a locking strut 15 (i.e. FIG. 8) that lays down in its pocket 14 during an overrunning condition of the assembly at a laydown angular velocity of the coupling member 14 about a rotational axis 16 of the assembly. Each pocket 14 has a pocket axis 17 (only shown for pocket #1 in FIG. 2) which is angled with respect to a normal 18 to the centerline 20 to improve locking member dynamics during the overrunning condition.

The pocket axis 17 of each pocket 14 is rotated outwardly or counter clockwise with respect to the normal as shown in FIG. 2.

The locking member 15 is preferably a locking strut.

The coupling face 12 is preferably an annular coupling face 12. The coupling face 12 has the plurality of pockets 14 and each pocket 14 has a "T" shape.

Each pocket 14 has an inner recess 24 (FIG. 8) for receiving a biasing spring (not shown) wherein each pocket 14 is a spring pocket.

The annular coupling face 12 is oriented to face axially along the rotational axis 16. Splines 22 are provided on the inner diameter of the plate 10 to transfer torque to or from the plate 10.

Figure 3:
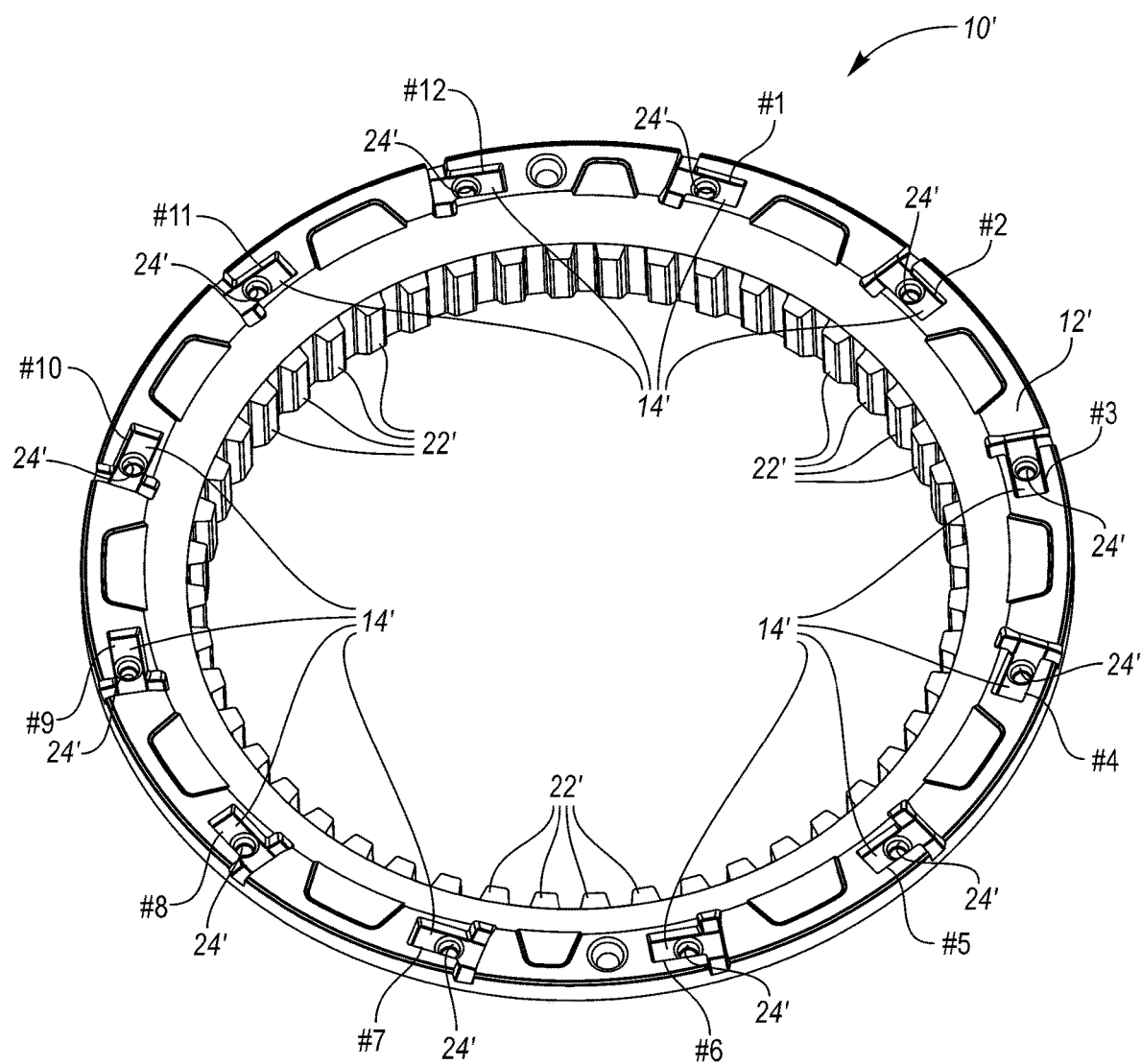
FIG. 3 is a view similar to the view of FIG. 1 except the struts tips are angled inwardly.
Figure 4:
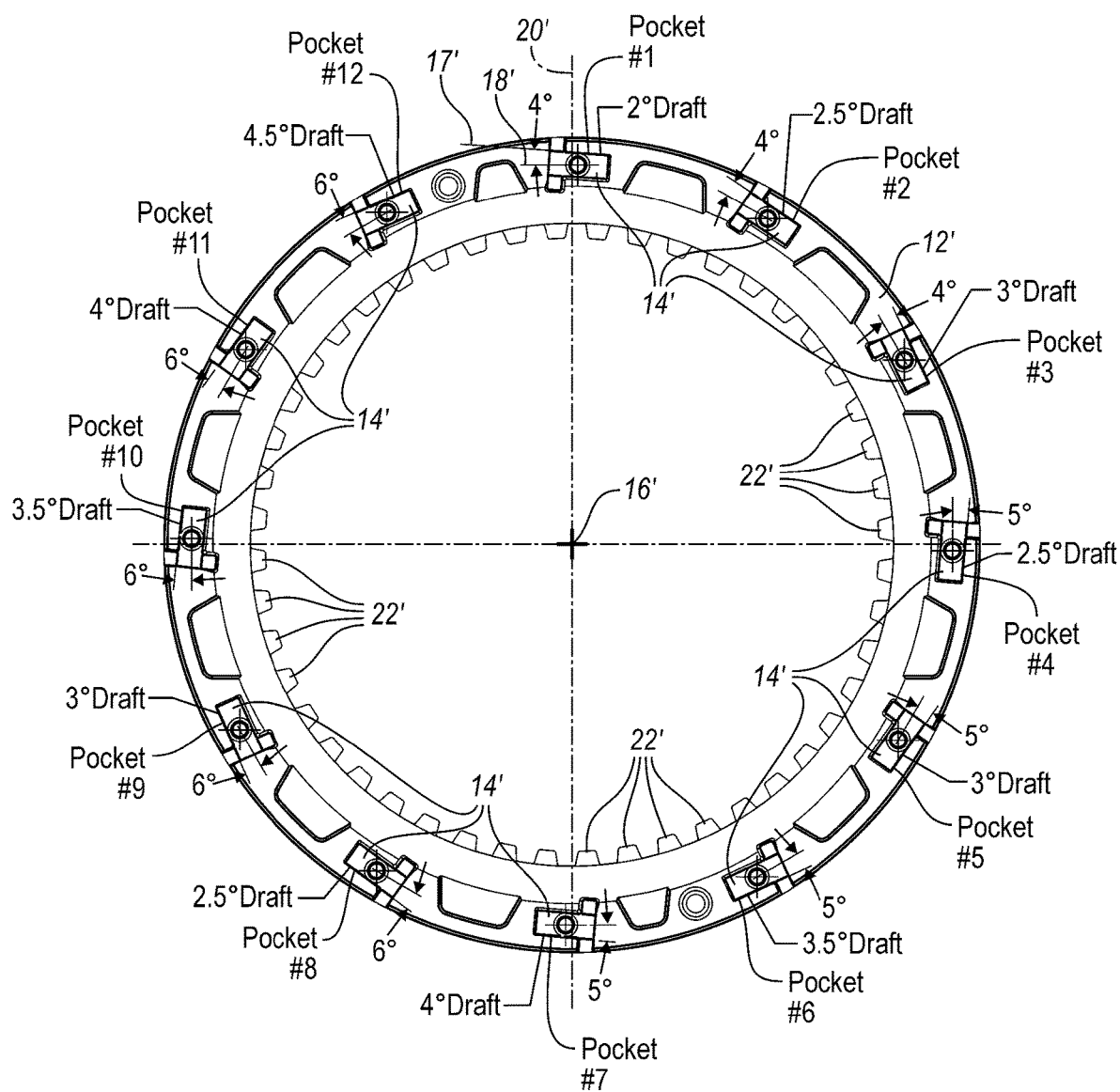
FIG. 4 is similar to the view of FIG. 2 but with the changes shown in FIG. 3.

FIGS. 3 and 4 show a coupling member or pocket plate 10' which is substantially identical to the pocket plate 10 of FIGS. 1 and 2 and, consequently, like parts have the same reference number but a single prime designation. The pocket plate 10' is substantially identical to the pocket plate 10 except the pockets 14' have an inward rotation. Each pocket 14' of pocket plate 10' has the same draft angle and the same magnitude of rotation as the corresponding pocket 14 in pocket plate 10. As previously mentioned, the pocket plate embodiment of FIGS. 3 and 4 (i.e. inward pocket rotation) is used when it is desired that the resulting clutch engage at a relatively high RPM as shown in FIG. 9.

Each pocket axis 17 is angled with respect to the normal 18 in a range of −5° to 10° as shown in FIG. 9.

Figure 5:
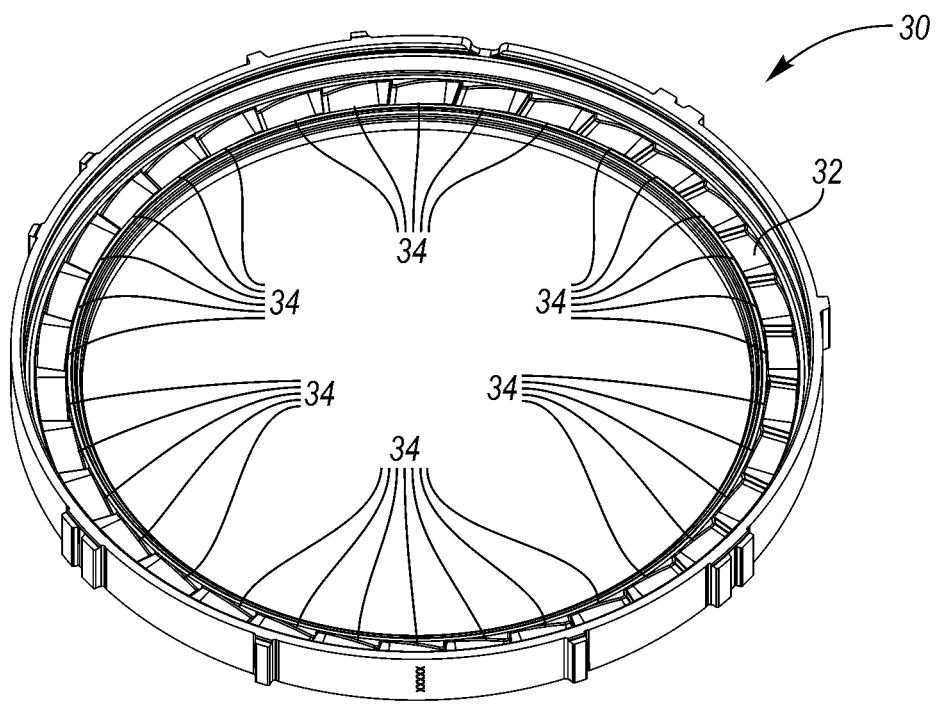
FIG. 5 is a schematic perspective view of a second coupling member in the form of a notch plate for use with the pocket plate of FIG. 1 and showing notches rotated to correspond to rotated pockets of a pocket plate.
Figure 6:
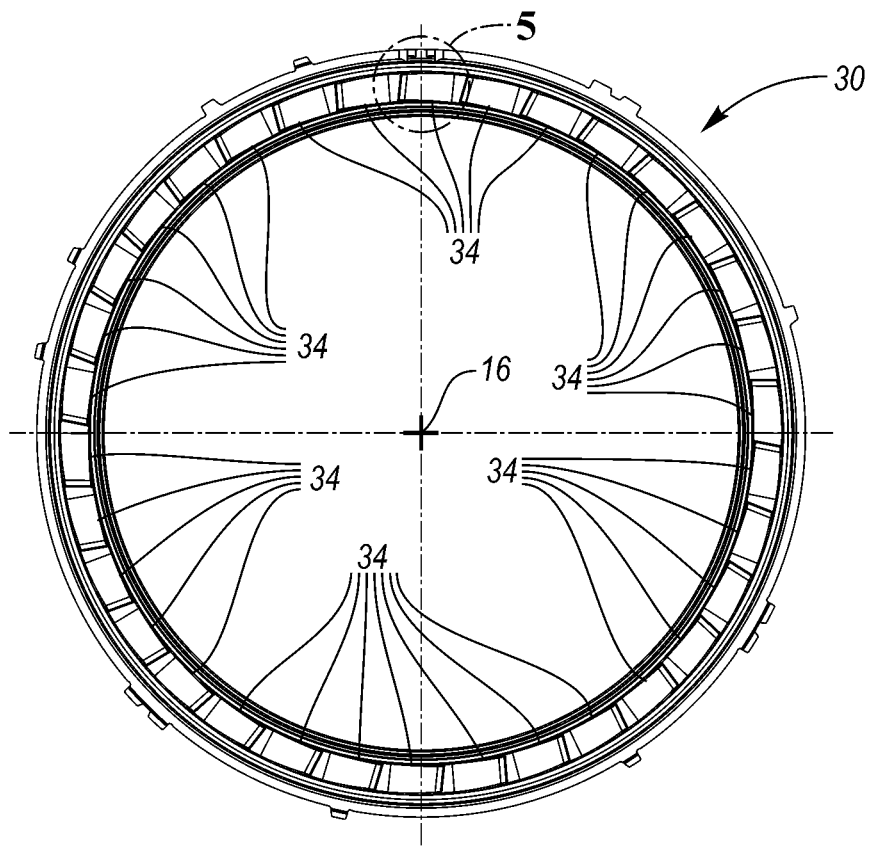
FIG. 6 is a top plan view of the notch plate of FIG. 5.
Figure 7:
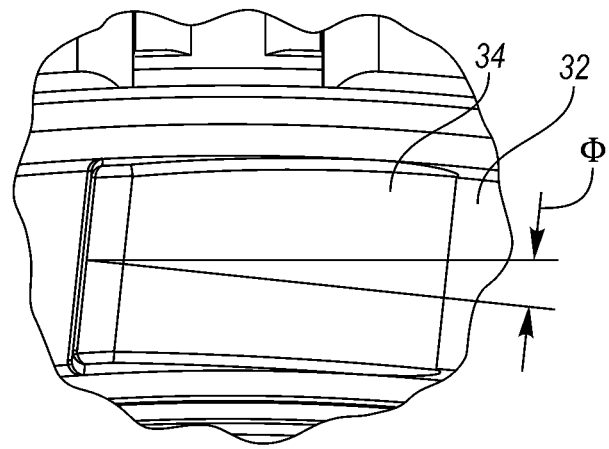
FIG. 7 is an enlarged view of the circled area of FIG. 6 to better show the angle of rotation of one of the notches.

A combination of the pocket plate 10 with a second coupling member 20 of FIGS. 5 and 6 and one or more locking struts 15 form a coupling or clutch assembly having the central axis 16.

The annular notch plate 30 extends around the central axis 16 and includes notches 34 spaced from each other about the central axis 16. The notches 34 are formed in a coupling face 32 of the notch plate 30. The notches 34 are angled Φ which corresponds to at least one of the angles Φ of the pocket plate 10 or −Φ when used with the pocket plate 10'.

The following equations relate to the previously described new moment on a strut due to centripetal force and other factors affecting laydown speed, wherein:
Sm=Strut Moment
M=strut mass
R=pitch radius of strut
W=angular velocity of pocket plate
Sf=spring force
Ls=distance between pocket lock up face and spring center
Lo=distance between pocket lock up face and outer overrun face
Ew=Ear width
Θ=draft angle
Φ=entire pocket (or, alternatively, outer wall and inner pocket ear of pocket) rotation angle
Fc=coefficient of friction
Pm=distance between strut pivot point to strut center of mass
Bp=distance between back of strut to strut pivot point
St=thickness of strut
ε=front ear wall angle
For angle Φ<0 (i.e. inward rotation)

Inward Strut Rotation (*CW* Pocket Rotation, strut tip towards *ID* (i.e. inner diameter of plate 10)
$Sm = Sf*Ls + ((M*r*w^2*Cos(\hat{}\Phi))/(Cos(\Theta) - Fc*Sin(\Theta)))*(Sin(\Theta)*(Pm+Bp) - Fc*Cos(\Theta)*(Pm+Bp)) + M*r*w^2*Sin(\Phi)*St/2$ For angle Φ>0 or, Φ=0) (no rotation or outward rotation)

Outward Strut Rotation (*CCW* Pocket Rotation, strut tip towards *OD* (i.e. outer diameter of plate 10)
$Sm = Sf*(Ls-Lo+Ew) + M*r*w^2*(Sin(\Theta)*Cos(\Theta) - Fc*(Cos(\Theta))^2)*(Pm) - M*r*w^2*Sin(\Phi)*(St + (Fc*(Sin(\varepsilon)*(St-Tan(\varepsilon)*(Ew)) + (Ew/Cos(\varepsilon))) - Cos(\varepsilon)*(St-Tan(\varepsilon)*(Ew))/(Fc*Sin(\varepsilon) - Cos(\varepsilon) + Fc^2*Cos(\varepsilon) - Fc*Sin(\varepsilon))))$ In summary, the inventors discovered that the orientation of a locking member or strut with respect to the normal of the centerline of the pocket plate has an effect on the dynamic characteristics with regards to strut laydown speed. Counter clockwise rotation of the pocket axis tends to decrease the speed at which the strut lays down, whereas clockwise rotation tends to increase the laydown speed.

Counter clockwise rotation of the pocket(s) (i.e. with strut tip(s) towards outer diameter of the clutch) can reduce the sensitivity to oil requirements as well as aid in manufacturability by opening functional dimensional tolerances. Counter-clockwise rotation of the pocket(s) tends to decrease the strut laydown speed. This has a tendency to increase the resilience of the clutch to low oil conditions which might otherwise increase strut instability.

Conversely, clockwise rotation of the pocket(s) (i.e. with strut tip(s) towards the inner diameter of the clutch) tends to increase the strut laydown speed. This can be beneficial in clutch applications wherein the struts are required to be active at higher speeds, such as a dynamic application in which the clutch is required to be able to engage at high pocket plate and notch plate speeds.

Based on the discoveries of the inventors, instead of having the orientation of pocket primary or pocket axis normal to a center line passing through MD, the inventors made the strut's primary or pocket axis differ by an angle normal to that of the plate's center line.

Figure 10:
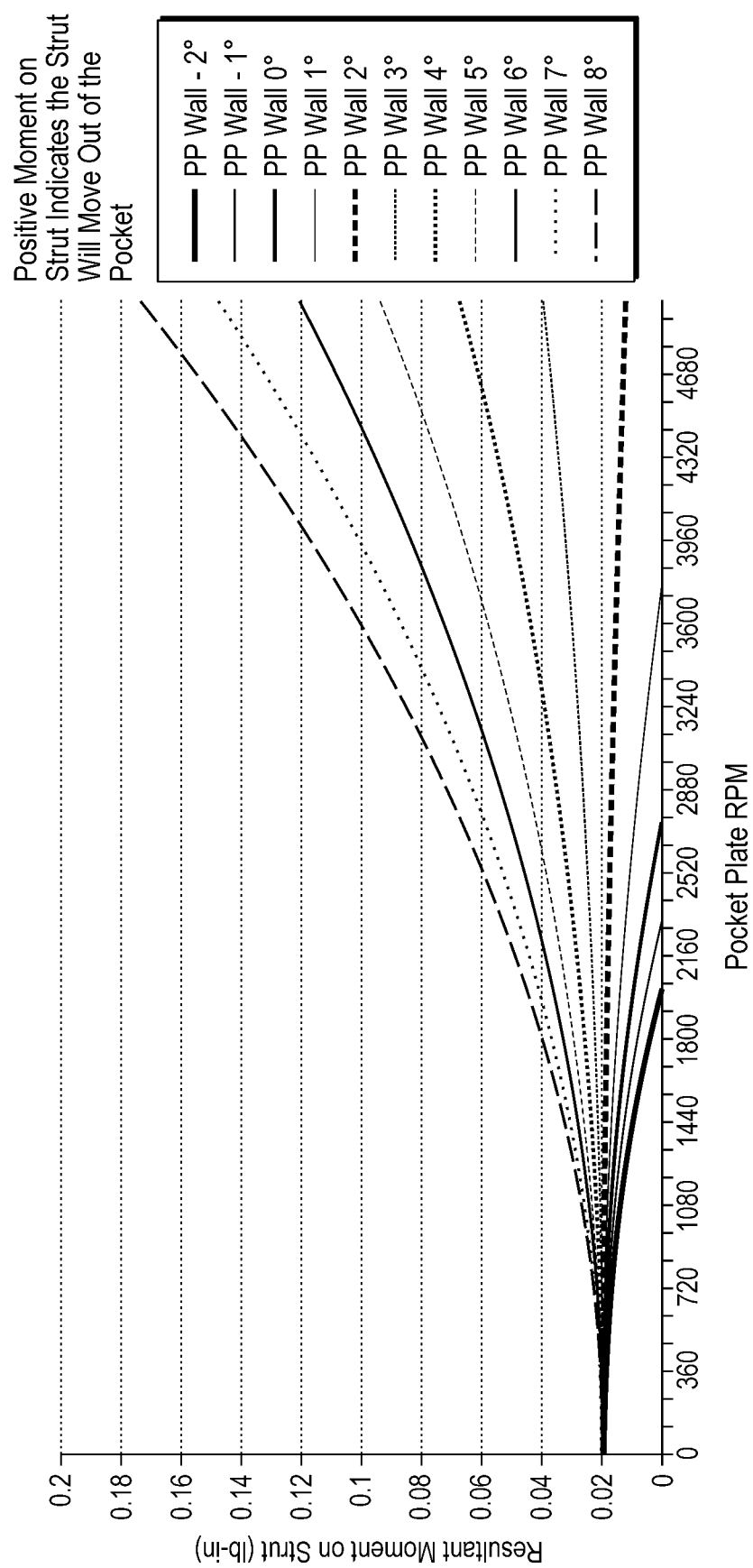
FIG. 10 shows graphs of resultant moment on a strut versus pocket plate RPM for various wall drafts and no pocket rotation.

The previously described "strut instabilities" and the damage it causes relates to improper dynamics of the strut. The strut dynamics are engineered such that at certain conditions (usually identified by a pocket plate RPM range as shown in FIGS. 9 and 10) the strut is no longer able to rise and remains in the pocket, compressing its biasing spring for the duration it is seated within the pocket. When these dynamics are altered the strut is allowed to leave the pocket during inappropriate circumstances, the result is strut instability which manifests as a distinct sound and vibration emanating from the component, and ultimately leads to failure.

As shown in FIG. 9, rotation of the pockets significantly alters the strut dynamics of the clutches. Inward rotation of the pocket contributes to a moment that would tend to raise the strut from the pocket; conversely, an outward rotation tends to lower it, acting against the spring force.

The graphs of FIG. 9 shows that from the baseline laydown speed of 3000 RPM, a −4° rotated pocket increases this speed to nearly 4500 RPM, a 50% increase. Conversely, the laydown speed can be reduced from the baseline laydown speed by nearly 50% by adding a positive rotation angle as also shown in FIG. 9. This rotation angle improves strut dynamics.

Figure 11:
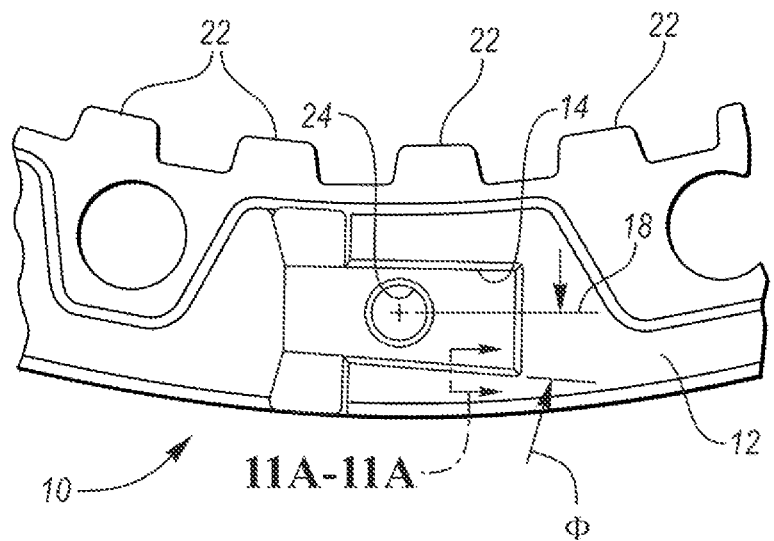
FIG. 11 is a view showing the inner wall of a pocket of a pocket plate parallel to a normal to the centerline and the outer wall of the pocket angled at an acute angle outwardly.
Figure 11A:
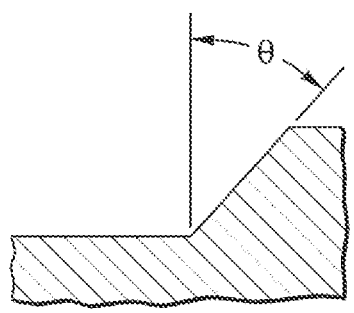
FIG. 11A is a view along the line 11A-11A shown in FIG. 11.

FIG. 11 is a view showing the inner wall of a pocket of a pocket plate parallel to a normal to the centerline and the outer wall of the pocket angled at an acute angle outwardly. FIG. 11A is a view along the line 11A-11A shown in FIG. 11.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A one-way clutch assembly having a central axis, the assembly comprising:
an annular pocket plate having a centerline through the central axis, the pocket plate including an annular coupling face having a plurality of pockets spaced from each other about the central axis, each of the pockets being sized and shaped to receive and nominally retain a locking member of a plurality of locking members that lays down in its pocket during an overrunning condition of the assembly at a laydown angular velocity of the pocket plate about the central axis and wherein each pocket has an inner pocket wall and an outer pocket wall, the inner pocket wall is parallel to a normal to the centerline, and the outer pocket wall is angled at an acute angle outwardly with respect to the normal to the centerline to improve locking member dynamics with regards to the laydown angular velocity during the overrunning condition;
an annular notch plate that extends around the central axis and includes notches spaced from each other about the central axis; and
the plurality of locking members received within the pockets, the locking members each having a center axis angled at the acute angle with respect to the normal to the centerline when the locking members are in both a raised and overrun condition.

2. The assembly as claimed in claim 1, wherein the inner pocket wall and the outer pocket wall of each pocket define a pocket axis therebetween, the pocket axis of each pocket is rotated outwardly with respect to the normal.

3. The assembly as claimed in claim 1, wherein each of the locking members is a locking strut.

4. The assembly as claimed in claim 1, wherein each pocket has an inner recess for receiving a biasing spring and wherein each pocket is a spring pocket.

5. The assembly as claimed in claim 1, wherein the annular coupling face is oriented to face axially along the central axis.

6. The assembly as claimed in claim 1, wherein the acute angle is in a range of 1° to 10°.

7. The assembly as claimed in claim 1, wherein the notches of the annular notch plate are angled at the acute angle with respect to the normal to the centerline.

8. The assembly as claimed in claim 1, wherein the outer pocket wall has a positive draft angle, the acute angle is in direct proportion to the positive draft angle to improve the locking member dynamics with regards to the laydown angular velocity during the overrunning condition.

9. A one-way clutch assembly having a central axis, the assembly comprising:
an annular pocket plate having a centerline through the central axis, the pocket plate including an annular coupling face having a plurality of pockets spaced from each other about the central axis, each of the pockets being sized and shaped to receive and nominally retain a locking member that lays down in its pocket during an overrunning condition of the assembly at a laydown angular velocity of the pocket plate about the central axis, wherein each pocket has an inner pocket wall and an outer pocket wall, the outer pocket wall has a positive draft angle, and the outer pocket wall is angled at an acute angle, in direct proportion to the positive draft angle, outwardly with respect to the inner pocket wall to improve locking member dynamics with regards to the laydown angular velocity during the overrunning condition.

10. The assembly as claimed in claim 9, wherein the positive draft angle of the outer pocket wall is in a range of 2° to 4.5° and the acute angle is in a range of 4° to 6°.

* * * * *